C. L. CAPPEL.
AUTOMOBILE TRUCK BODY.
APPLICATION FILED AUG. 25, 1916.

1,220,183.

Patented Mar. 27, 1917.
2 SHEETS—SHEET 1.

Witness
Ralph L. Marquis.

Inventor
Carl L. Cappel,
By Howard S. Smith,
His Attorney

C. L. CAPPEL.
AUTOMOBILE TRUCK BODY.
APPLICATION FILED AUG. 25, 1916.

1,220,183.

Patented Mar. 27, 1917.
2 SHEETS—SHEET 2.

UNITED STATES PATENT OFFICE.

CARL L. CAPPEL, OF DAYTON, OHIO.

AUTOMOBILE-TRUCK BODY.

1,220,183. Specification of Letters Patent. Patented Mar. 27, 1917.

Application filed August 25, 1916. Serial No. 116,811.

*To all whom it may concern:*

Be it known that I, CARL L. CAPPEL, a citizen of the United States, residing at Dayton, in the county of Montgomery and State of Ohio, have invented certain new and useful Improvements in Automobile-Truck Bodies, of which the following is a specification.

This invention relates to new and useful improvements in automobile truck bodies.

The principal object of the invention is to provide an automobile truck body in which the longitudinal supporting parts of the frame that break, sag and deteriorate from usage and other causes, are strengthened and conserved. It is not infrequent to find the end and other members of a truck body mashed or broken in places after a few heavy loads are carried thereby, particularly when rough streets and roads are encountered. My invention obviates these difficulties by providing for the body parts that are exposed to such injuries, an efficient and protecting construction.

It is another object of my invention to provide for the automobile truck body, a strong and durable tail-board which may be readily lowered and raised, and easily adjusted and firmly held in different positions without the use of chains which rattle, and often scratch the body frame.

Figure 1:
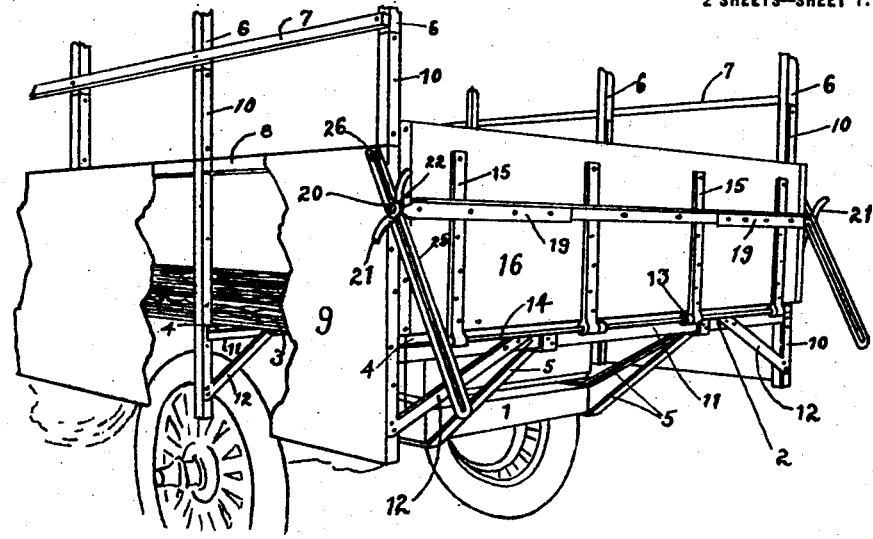
Figure 2:
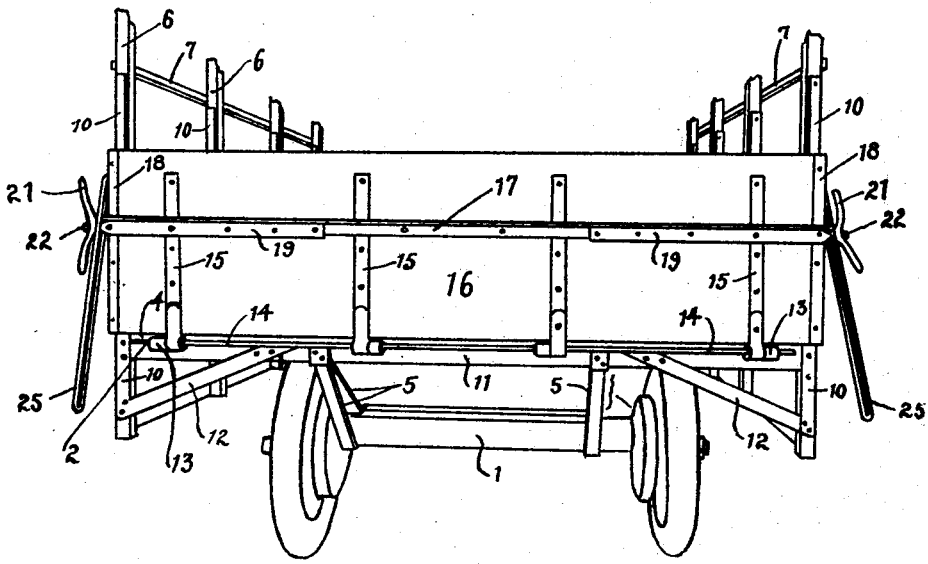
Figure 3:
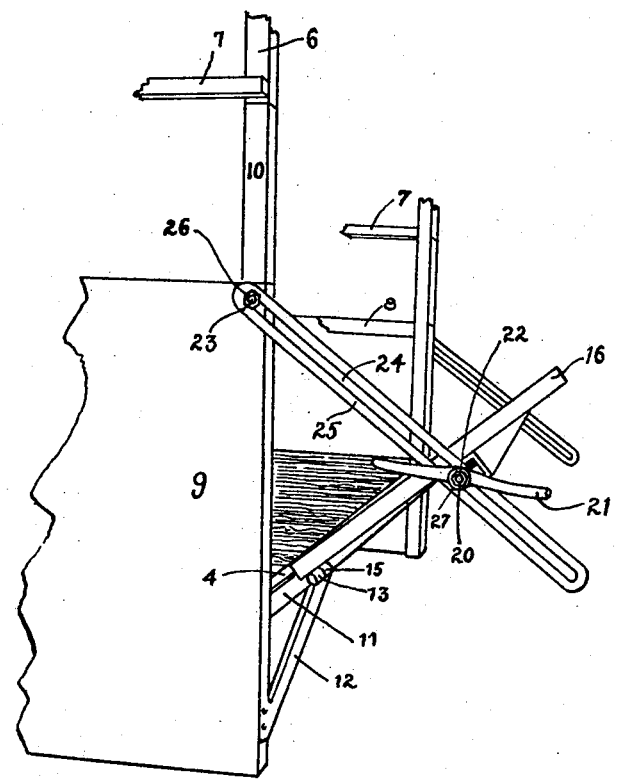

The preferred form of embodiment of my invention is illustrated in the accompanying drawings, of which Figure 1 is a perspective view of the rear portion of an automobile truck body equipped with my improved devices. Fig. 2 is an elevational view of the end of said truck body. And Fig. 3 is a side view of the rear portion of said body, showing the tail-board or end-gate in an inclined position.

Throughout the specification and drawings, similar reference characters denote corresponding parts.

In a detailed description of the preferred form of embodiment of my invention, the numeral 1 designates an automobile chassis upon which is suitably mounted a body 2 constructed of wood, although my invention is equally applicable to one constructed of flat metal. The body 2 has a floor 3 which rests upon cross bars 4. As these bars are all alike, the end one only will be described.

The end cross bar 4 is supported by bolsters 5 secured to the chassis 1 of the machine. Each end of said cross bar is mortised in the lower portion of an upright 6. Top rails 7 and intermediate side rails 8 are attached to these uprights which also support a sign board 9.

For the purpose of strengthening the cross bars 4 and uprights 6, and preventing them from being damaged or broken, the following construction is provided. Suitably secured to each upright 6 is an angle iron 10, which preferably extends from a point below the top of the upright to a point below the cross bar 4 to which the latter is attached.

Each cross bar 4 has secured thereto an angle iron 11 to each end portion of which is attached an inclined brace 12 that is connected to the angle iron 10 of the upright 6 into which said cross bar is mortised. Each brace 12 therefore forms with its respective angle irons 10 and 11, a triangular support which prevents the sides and ends of the truck body from sagging. Furthermore, the angle irons strengthen and conserve the cross bars 4 and uprights 6, to the end that the life of an automobile truck body is materially lengthened.

The tail-board construction of the automobile truck body will now be described. Integral with or otherwise secured to the angle iron 11 of the end cross bar 4, are outwardly projecting looped metallic members 13 which receive a laterally-disposed rod 14. The latter loosely passes through, and supports, the lower looped ends of upright metallic pieces 15 to which a tail-board or endgate 16 is secured. The rod 14 therefore forms with the lower ends of the pieces 15, a hinge construction whereby the tail-board 16 may be easily lowered or raised.

Crossing, and secured to the metallic pieces 15 near the upper ends thereof, is an angle iron 17 that is connected at its ends to upright angle irons 18 which are attached to the side edges of the tail-board 16. Secured to the vertical faces of the angle irons 18 are metallic members 19 which present a flat surface to the angle irons but terminate in round threaded ends 20 which are adapted to receive wing or handle nuts 21, and lock nuts 22, for a purpose now to be described.

Secured to the side face of each end upright 6 at a point preferably below the top of the tail-board 16 when the latter is in its closing position, is a threaded pin 23 which loosely extends through an elongated slot 24 in a retaining member 25, the latter being held on said pin by a nut 26. (See Fig. 3).

The threaded end 20 of the member 19 also extends through the slot 24, there being on the pin 20 beyond the member 25, a washer 27 adapted to be pressed against said retaining member by the handle nut 21. When the latter is turned to move away from this retaining member 25, the tailboard 16 may be lowered or raised, since the pin 20 is of a diameter which permits it to travel freely through the slot 24 of said member during the movement of the latter about its pivot pin 23. By turning the handle nut 21 in the opposite direction sufficiently to press the washer 27 tightly against the member 25, the tail board 16 may be firmly held in any desired position and locked therein by the nut 22. In Fig. 3 it is shown in a position at an angle of about forty-five degrees to the uprights 6. It is thus obvious that I have provided for my truck body, a tail-board or end-gate which is not only strong and durable but which may be easily fastened in a desired position.

I do not wish to be limited to the details of construction and arrangement herein shown and described, and any changes or modifications may be made therein within the scope of the subjoined claims.

Having described my invention, I claim:

1. An automobile truck body comprising a floor, cross bars supporting said floor, a pair of uprights secured to each cross bar, angle irons attached to said uprights and their respective cross bars, and bracing means connected between the angle iron of each cross bar and the angle irons of the uprights to which said cross bar is secured.

2. An automobile truck body comprising a floor, cross bars supporting said floor, an upright secured to each end of a cross bar, said uprights extending below their respective cross bars, and a bracing member extending between the lower end of each upright and the adjacent end of the cross bar to which said upright is attached, to form a rigid support for the truck body.

3. An automobile truck body comprising a floor, cross bars supporting said floor, an upright into which each end of a cross bar is mortised, an angle iron secured to each upright, an angle iron also secured to each cross bar, the angle irons of the uprights extending below the angle irons of their respective cross bars, and an inclined bracing piece connected between the lower end of each upright angle iron and the adjacent end of the cross bar angle iron to which said upright axle iron is secured, to form a firm support for the truck body.

In testimony whereof I have hereunto set my hand this 21st day of August, 1916.

CARL L. CAPPEL.

Witnesses:
ERNEST T. HUSTON,
D. M. DOWD.

Copies of this patent may be obtained for five cents each, by addressing the "Commissioner of Patents, Washington, D. C."